Figure 1:
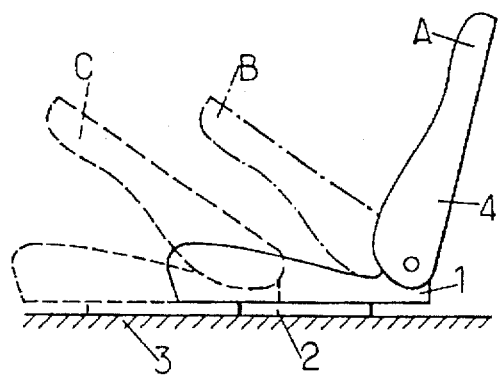

United States Patent
Reubeuze et al.

[11] Patent Number: 5,688,026
[45] Date of Patent: Nov. 18, 1997

[54] SLIDES FOR VEHICLE SEATS, AND TO SEATS FITTED WITH SUCH SLIDES

[75] Inventors: Yann Reubeuze, Landigou; Jean-Marie Fretel, Ger, both of France

[73] Assignee: Bertrand Faure Equipements SA, France

[21] Appl. No.: 593,245
[22] Filed: Jan. 29, 1996

[30] Foreign Application Priority Data

Jan. 30, 1995 [FR] France .................... 95 01023

[51] Int. Cl.$^6$ .................................. A47C 1/02
[52] U.S. Cl. ................ 297/341; 297/344.1; 248/429
[58] Field of Search ................. 297/341, 344.1; 248/429, 424

[56] References Cited

U.S. PATENT DOCUMENTS

| | | | |
|---|---|---|---|
| 3,940,182 | 2/1976 | Tamura | 297/341 |
| 4,101,169 | 7/1978 | Muraishi et al. | |
| 4,648,657 | 3/1987 | Cox et al. | 297/341 |
| 4,652,052 | 3/1987 | Hessler et al. | 297/341 |
| 4,881,774 | 11/1989 | Bradley et al. | |
| 5,100,092 | 3/1992 | Sovis | |
| 5,137,331 | 8/1992 | Colozza | 297/341 |
| 5,407,165 | 4/1995 | Balocke | |

FOREIGN PATENT DOCUMENTS

| | | |
|---|---|---|
| 0 135 596 | 4/1985 | European Pat. Off. |
| 0 196 773 | 10/1986 | European Pat. Off. |
| 0 589 759 | 3/1994 | European Pat. Off. |
| 2 449 549 | 9/1980 | France |
| 27 08 423 | 9/1977 | Germany |

*Primary Examiner*—Laurie K. Cranmer
*Attorney, Agent, or Firm*—Larson and Taylor

[57] ABSTRACT

The slide enables the longitudinal position of a vehicle seat to be adjusted while also making it possible for the seat to be moved back-and-forth through a large amplitude in a forwards direction from its rear position and to return to said adjusted position because of a position-memorizing assembly comprising a notched bar 7, a shoe 8, and a catch 9 having a hook 9a. A rocker 10 is provided that pivots on the moving rail 2 making it possible either to connect the shoe to the moving rail, thereby making it possible to control the latch 5, or else to keep the latch disengaged with the shoe being locked by the catch, the rocker being controlled by a cable 12 that is pulled by folding down the back, and the tail 8a of the shoe is shaped so that it can lock the seat in position whenever the back is raised, even if the seat happens to be in a position other than its memorized position.

4 Claims, 2 Drawing Sheets

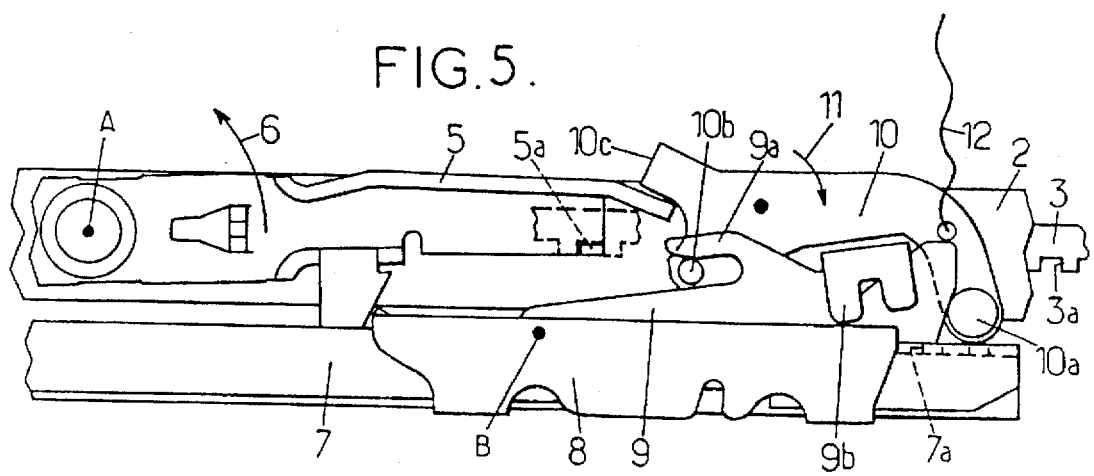
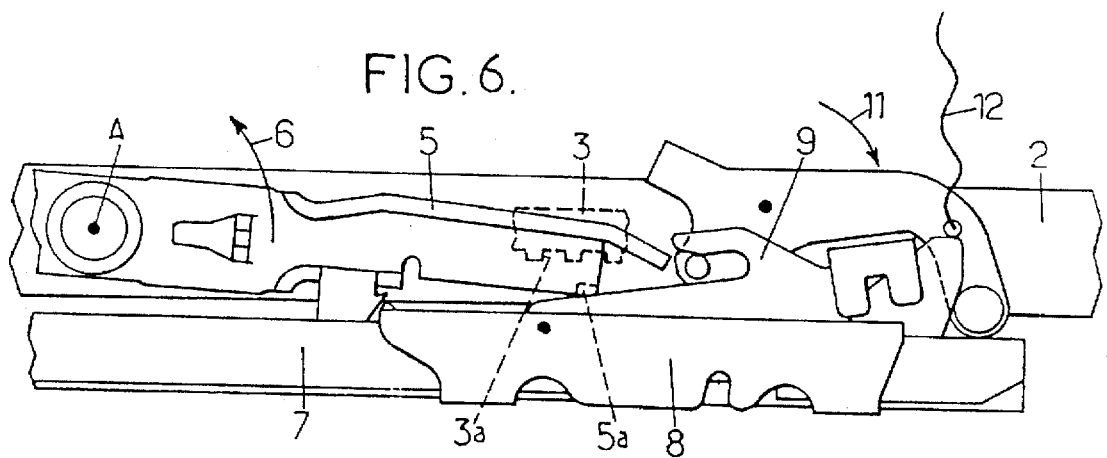
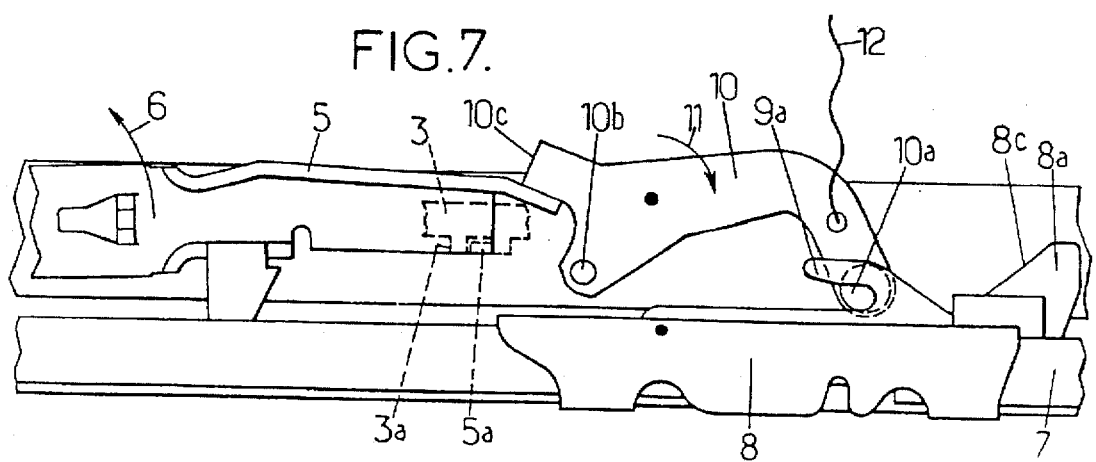

SLIDES FOR VEHICLE SEATS, AND TO SEATS FITTED WITH SUCH SLIDES

The invention relates to slides for vehicle seats, i.e. to devices enabling the longitudinal or "forwards-and-backwards" position of such a seat to be adjusted, and it also relates to seats fitted with such slides.

More particularly, the invention relates to such slides that include a memory mechanism, i.e. a mechanism making it possible not only to move the seat back-and-forth through a large amplitude in the longitudinal direction starting from a preadjusted rear position, but also to return the seat automatically to said preadjusted position after it has been moved.

Such slides are fitted, in particular, to vehicles that have only two side doors, and that have back seats as well as the front seats which are mounted on slides: access to the back seats is made possible by a combination of moving a front seat forwards and folding down the back of the front seat.

In known manner, slides of the kind in question to which the invention applies comprise: a stationary longitudinal rail, i.e. for fixing to the floor of the vehicle; a moving longitudinal rail slidably mounted on the stationary rail and intended to support the seat; a rack of notches carried by the stationary rail; a latch mounted to pivot about a first transverse horizontal axis tied to the moving rail and suitable for co-operating with the notches of the stationary rail under the control of a member that is easily accessible for a person sitting on the seat; resilient means for continuously urging the latch towards a notch-engaging locking position; a longitudinal notched bar secured to the stationary rail; a shoe slidably mounted to slide along the bar; a catch for locking the shoe and mounted to pivot about a second transverse horizontal axis tied to the shoe and suitable for optionally co-operating with the notches of the bar so as to optionally lock the shoe relative to the bar, said catch including a top hook that is open horizontally facing towards the front of the seat; a rocker pivotally mounted about a third transverse horizontal axis tied to the moving rail, which rocker includes a first transverse finger organized to co-operate with the rear end of the shoe, a second transverse finger suitable for co-operating with the hook of the catch, and a heel suitable for co-operating with the latch; and resilient means for constantly urging the rocker in a first direction towards a first extreme angular position in which firstly the first finger is in a low position for horizontally entraining the shoe, and secondly the second finger raises the hook of the locking catch of the shoe into its release position, and finally the heel releases the latch from its notches.

When the rocker is in this first extreme angular position, its first transverse finger and an abutment of the latch longitudinally overlie the memory assembly constituted by the shoe and its catch which is then in its release position: in other words, the moving rail is then longitudinally tied to said assembly and can be moved therewith.

The normal controls of the latch made available to the user, which controls work when the rocker is in this extreme angular position, then serve to adjust the longitudinal position of the seat, by entraining the memory assembly together therewith.

On the contrary, when the rocker is placed in its other extreme angular position by using means described in greater detail below:

the latch is held disengaged from its locking notches;
the catch holds the shoe in a determined memorization position along the notched bar; and
the moving rail is free to move relative to the assembly constituted by said bar, the shoe, and its catch.

These three features in combination make it possible for the moving rail to move back-and-forth longitudinally through large amplitude relative to the stationary rail, starting from a preadjusted rear position, and finally returning the moving rail to its preadjusted position, with such return being followed by longitudinal locking taking place again due to the consequent return of the rocker into its first extreme angular position.

In general, such slides give satisfaction.

However, known embodiments of said slides (see document FR-A-2 449 549) still suffer from several drawbacks, such as the following:

the return of the latch into its locked position requires return of the rocker into its first extreme angular position, which can take place only when the rocker is in its initial longitudinal position where its first finger can again drop down behind the shoe: such longitudinal return implies total absence of any obstacle immediately behind the seat in question, and if such an obstacle is present, e.g. a piece of baggage or the foot of a back-seat passenger, then it is not possible to lock the slide again; and tilting is controlled by means of special operating handles connected by rodding to the hinge mechanism of the seat back: the user must thus operate said handles in order to fold down the back.

A particular object of the invention is to remedy the above drawbacks.

To this end, a slide of the above kind is essentially characterized, according to the invention, in that it further comprises servo-control means for causing forward folding down of the seat back to urge the rocker angularly in the opposite direction to the first above-defined direction, and in that the rear portion of its shoe suitable for co-operating with the first finger of the rocker has a downwardly-open V-shaped profile in a longitudinal vertical plane, which profile is rearwardly defined by an edge which is vertical or which slopes downwards in a forwards direction, and is forwardly defined by a sloping ramp that extends downwards in a forwards direction.

In preferred embodiments, use is made of one or more of the following dispositions:

the servo-control means for controlling the angular displacements of the rocker as a function of the folding down of the seat back comprise an inextensible cable whose two ends are connected respectively to the rocker and to the seat back; and resilient means are provided for angularly urging the seat back into its position in which it is folded down angularly forwards, and said means are associated with the hinge mechanism of the seat back so as to intervene only when said mechanism is disengaged.

In addition to the above main dispositions, the invention includes other dispositions which are preferably used simultaneously therewith and which are explained more fully below.

There follows a description of a preferred embodiment of the invention given with reference to the accompanying drawings, and naturally given in non-limiting manner.

Figure 2:
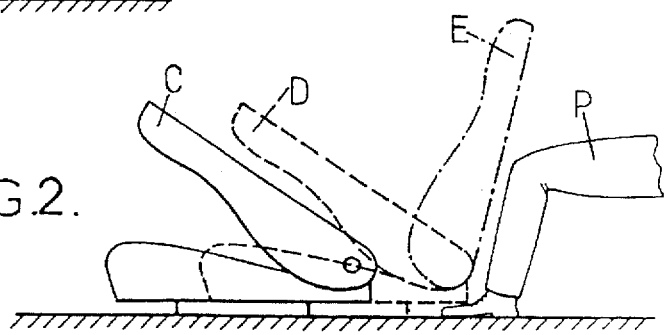

FIGS. 1 and 2 of the drawings are highly diagrammatic side views showing various relative positions that can be taken up by the seat proper and by the seat back of a vehicle seat fitted with a slide of the invention while performing a cycle of operations to give access to a back seat.

Figure 3:
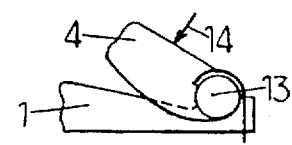
Figure 3:
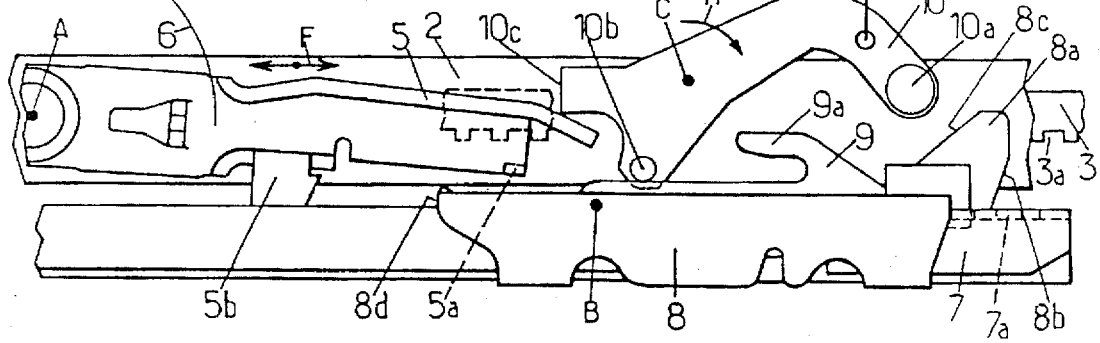

FIG. 3 is a diagram showing a portion of such a slide in its state corresponding to large-amplitude back-and-forth displacement of the seat forwards of its preadjusted rear position, with its back folded down forwardly.

FIGS. 4, 5, 6, and 7 are similar diagrams showing the same slide in the following respective states:

return of the seat to a memorized rear longitudinal position with the rocker beginning to pivot;

return of the rocker to its extreme angular position corresponding to normal operation;

normal release of the slide for longitudinal adjustment of the seat, entraining the memory means therewith; and locking of the seat in an intermediate position other than that determined by the memory means.

FIGS. 1 and 2 are highly diagrammatic and show a vehicle seat comprising a seat proper 1 mounted on a moving rail 2, itself mounted to slide longitudinally on a stationary rail 3, the seat having a seat back 4 hinged to the rear end thereof.

The five positions A, B, C, D, and E shown in FIGS. 1 and 2 correspond to the positions that follow one another while giving a passenger P access to a back seat located behind the seat in question, which seat is assumed to occupy a front seat position in a so-called "three door" vehicle, i.e. a vehicle that has only two side doors.

Initially, the seat in question occupies position A (FIG. 1).

Starting from position A, the seat back 4 is folded down forwardly to position B, and then the seat is pushed towards an extreme front position C with its back in the folded-down position.

The passenger P then gets onto the back seat, after which the front seat is moved backwards with its back still in the folded-down position, going from position C to position D.

Position D may be identical to above position B providing the seat is not impeded from moving backwards by an obstacle such as a piece of baggage or the foot or leg of the back-seat passenger.

The above does not apply to the case shown diagrammatically in FIG. 2, given that position D is not so far back as above position B.

It is then no longer possible to return the seat to its preadjusted rear position, to which position it could have returned accurately, had there not been any obstacle, given the conventional memory means that are provided.

With prior art slides, the above impediment to accurate return makes it impossible to lock the two rails 2 and 3 together again safely.

As explained below, such locking is obtained in the present case solely by raising the seat back so that it occupies position E (FIG. 2).

More precisely, the slide which enables the longitudinal position of the seat to be adjusted comprises, not only the stationary rail 3 with its rack of downwardly directed notches 3a and designed to be fixed on the floor of the vehicle, together with the moving rail 2 that is mounted to slide longitudinally on the stationary rail 3, in particular via interposed ball bearings (not shown), and which is intended to carry the seat, but also the following:

a latch 5 pivotally mounted about a first transverse horizontal axis A tied to the moving rail 2 and having at least one tooth 5a or the like suitable for co-operating with the notches 3a under the control of a member that is easily accessible to a person sitting on the seat, which member may be in the form of an arcuate bar (not shown) extending transversely beneath the front portion of the seat proper of the seat, which arcuate bar is secured to said latch 5;

a spring represented by arrow 6 suitable for constantly urging the latch 5 to its angular locking position in which the tooth 5a is inserted in one of the notches 3a;

a longitudinal bar 7 notched at 7a and secured to the stationary rail 3;

a shoe 8 mounted to slide along the bar 7 and disposed astride it;

a catch 9 for locking the shoe 8, which catch is pivotally mounted about a second horizontal axis B tied to the shoe and organized in such a manner as to be capable of occupying two extreme positions respectively corresponding to leaving the shoe free to slide along the bar and to locking it to prevent such sliding, which catch includes a top hook 9a horizontally opened towards the front of the seat;

a rocker 10 mounted to pivot about a third transverse horizontal axis C tied to the moving rail 2, the rocker including a rear transverse first finger or peg 10a organized to co-operate with the rear end of the shoe 8, a bottom second peg or finger 10b suitable for co-operating with the hook 9a, and a heel 10c suitable for co-operating with the latch 5; and a spring represented by arrow 11 constantly urging the rocker 10 in a first direction about the axis C towards its extreme angular position in which the first finger 10a is in its low position for horizontally entraining the shoe 8, being behind the shoe, with the second finger 10b co-operating with the hook 9a so as to raise the catch 9 into its position for releasing the shoe 8 relative to the bar 7, and the heel 10c located far enough above the latch 5 to make locking thereof possible.

In addition, an inextensible cable 12 is secured to the rocker 10 so as to drive it angularly about the axis C in the opposite direction to the spring 11.

The cable 12 is secured to the seat back 4 so as to be tensioned vertically when the seat back is folded down forwardly (see FIG. 3), and on the contrary so as to be relaxed when the seat back is in a normal, upstanding position (FIGS. 4 to 7). For this purpose, its end opposite from the end secured to the rocker 10 is advantageously secured to the end of a circularly curved bearing surface 13 tied to the seat back 4 and centered on the hinge axis thereof.

In addition, the rear end or tail 8a of the shoe 8 against which the finger 10a comes into horizontal abutment in its rear low position is generally in the shape of an upside-down V in a longitudinal vertical plane, or more precisely its shape corresponds to that of the top central element of an airplane tail: its rear edge 8b has a vertical top segment connected to a segment that is inclined slightly relative to the vertical sloping down in a forwards direction, and its front edge 8c forms a sloping plane ramp that goes down in a forwards direction being inclined at about 45° to the vertical.

The above-described assembly operates as follows.

In its initial state shown diagrammatically in FIG. 3, it is assumed that the cable 12 is tensioned, such that the rocker 10 is in its extreme angular position in a counter-clockwise direction about the axis C, as shown in the figure.

In this state, the finger 10a is in a high position clear of the tail 8a, the finger 10b is in a low position where it does not raise the catch 9, which has the effect of locking the shoe 8 on the bar 7, and the heel 10c bears vertically against the end of the latch 5, thereby keeping it disengaged from the notches 3a.

In other words, the moving rail 2 is free to move longitudinally along the stationary rail 3 while nevertheless leaving the memory assembly constituted by the shoe 8 and its catch 9 in a well-defined position.

This freedom in longitudinal displacement of the rail 2 is symbolized by double-headed arrow F.

It is in this state that the seat can be moved back-and-forth through a large amplitude corresponding to going from position B to position C as shown above and then from position C to position D.

Starting from the state shown in FIG. 3, if it is desired to put the rail into a rear position that is locked in safe manner, two options are available depending on whether it is possible to move the seat back all the way to its preadjusted position B (FIG. 1) or whether on the contrary the travel of the seat in a backward direction is interrupted at a position that is further forward (position D, FIG. 2) because there is a temporary obstacle P behind the seat.

Figure 4:
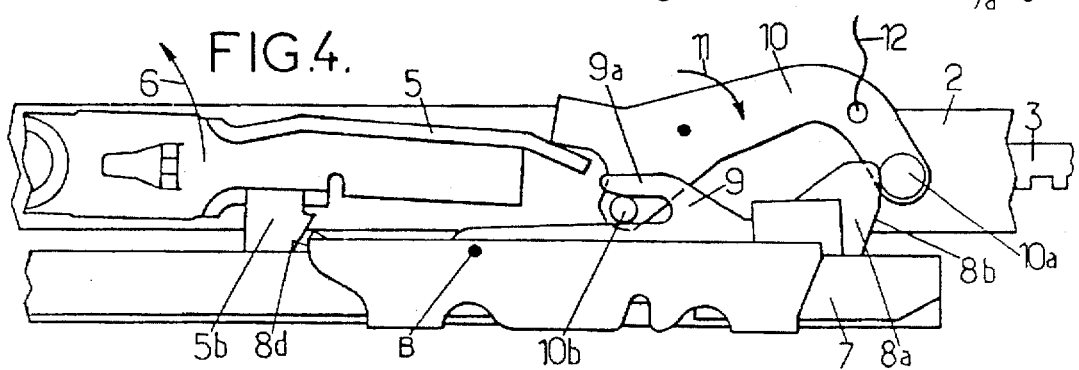

In the first case, full rearward travel of the seat is limited when a bearing surface 5b secured to the latch 5 comes into contact against the front edge 8d of the shoe 8, which contact defines the preadjusted longitudinal position of the seat (FIG. 4).

During rearward travel terminated by such contact, the seat back remains folded down forwardly, so the cable 12 continues to be under tension: retention of the seat back in the folded-down position is preferably ensured by an appropriate spring, represented diagrammatically by arrow 14, whose effect is released by release of an appropriate hinge latch (not shown).

As soon as the above-defined contact has been established, the seat back 4 is raised against the return force of the spring 14, thereby releasing the cable 12.

Whereupon the resilient force exerted by the spring 11 on the rocker 10 causes the rocker to tilt clockwise (FIGS. 4 and 5) thus giving rise to the following three consequences:

the finger 10a drops behind the tail 8a running along its rear edge 8b;

the finger 10b which at the end of rearwards travel of the rail 2 penetrated beneath the hook 9a of the catch 9 now raises the catch about the axis B because of its engagement with said hook: as can be seen in FIG. 5, this raising has the effect of disengaging the catch 9 and more precisely of disengaging at least one tooth 9b provided at the rear of the catch from the notches 7a of the bar 7, thereby disconnecting the shoe 8 from the bar and making it possible for it to slide longitudinally therealong; and the heel 10c moves vertically away from the rear end of the latch 5, making it possible for the tooth 5a or the like of said latch to penetrate into a notch 3a of the stationary rail 3.

The resulting state is shown in FIG. 5 and corresponds to normal locking of the slide.

Starting from this state, longitudinal adjustment of the seat can be performed in conventional manner by raising the control bar of the latch 5, thereby angularly displacing the latch 5 downwards about the axis A against the return force of the spring 6, thus disengaging its tooth 5a or the like from the notches 3a (FIG. 6): after such disengagement, the moving rail assembly 2 together with the entire equipment secured longitudinally herewith, including the memory assembly constituted by the shoe 8 and the catch 9, can be moved along the guide assembly as constituted by the stationary rail 3 and the bar 7.

As soon as a new desired longitudinal position is reached, it suffices to release the control bar of the latch 5 to allow the return spring 6 to lock the seat longitudinally again by inserting the tooth 5a of the latch 5 into one of the notches 3a of the rail 3.

After such longitudinal adjustment, the memory assembly 8–9 is again ready to perform its function since it has moved with the moving rail 2 during displacement thereof.

In the other situation mentioned above, in which the moving rail has been moved forwards through a large amplitude as described above but can no longer be returned all the way back towards its preadjusted position because an obstacle is present behind the seat, it is still possible in the present case to ensure safe locking of the seat.

In this case, it suffices merely to raise the seat back 4 for said incompletely moved-back position which corresponds to the position E shown diagrammatically in FIG. 2.

By releasing the cable 12, the rocker 10 is automatically caused to pivot clockwise under drive from the spring 11, as described above (FIG. 7).

As it pivots:

the finger 10a can again take up a position as low as that shown in FIG. 5 providing, naturally, it is not disposed vertically facing the tail 8a of the shoe 8 (it should be observed that said finger 10a is sufficiently offset relative to the catch 9 in the "transverse" direction perpendicular to the longitudinal direction of the seat to ensure that the catch 9 does not impede lowering of the finger 10a);

the finger 10b no longer raises the hook 9a since it lies in front of the hook, such that the memory assembly 8–9 remains in place; and as above, the heel 10c releases the latch 5 by making it possible to insert its tooth 5a into a notch 3a of the stationary rail 3.

Safe locking of the seat is thus again achieved even if it does not take place in the preadjusted longitudinal rear position.

Thereafter, the preadjusted position can again easily be reached once the obstacle P has been removed from behind the seat.

For this purpose, there is no need to exert traction on the cable 12 by folding the seat back down again in a forwards direction.

Merely pushing back the seat after disengaging the latch 5 suffices by co-operation between the finger 10a and the front ramp 8c of the tail 8a of the shoe to cause the rocker 10 to pivot counter-clockwise exactly as though traction had been applied on the cable 12, thereby firstly ensuring that the finger 10b moves back under the hook 9a, and secondly ensuring that the finger 10a goes beyond the top of the tail 8a with the resulting relaxation of the spring 11 on said apex being passed having the effect of returning the rocker 11 into its extreme angular position in the clockwise direction, as shown in FIG. 5, in which the memory assembly is again overlaid in substantially touching manner by the two elements 5b and 10a and is ready once more to slide along the bar 7 because the catch 9 has moved back into its release position.

As a result, and regardless of the particular embodiments adopted, a slide is provided whose structure and operation can be understood sufficiently from the above.

Compared with previously known slides the present slide presents various advantages, and in particular the following:

it makes it possible to lock the seat safely in a longitudinal direction after it has been moved in the longitudinal direction through a large amplitude even if its return or rearwards stroke towards its preadjusted position cannot be performed in full for the time being, and without that preventing said preadjusted position being found again subsequently as soon as the obstacle preventing backwards travel of the seat has itself been removed; and the mechanism is extremely simple to control since it does not require any special handles, control being provided automatically, merely by folding down the seat back.

Naturally, and as also can be seen from the above, the invention is not limited in any way to the particular applications and embodiments described in detail; on the contrary, the invention extends to any variants thereof.

We claim:

1. A vehicle seat slide comprising:

a stationary longitudinal rail;

a moving longitudinal rail slidably mounted on the stationary rail;

a rack of notches carried by the stationary rail;

a latch mounted to pivot about a first transverse horizontal axis tied to the moving rail and suitable for co-operating with the notches of the stationary rail under the control of a member that is easily accessible for a person sitting on the seat;

resilient means for continuously urging the latch towards a notch-engaging locking position;

a longitudinal notched bar secured to the stationary rail;

a shoe slidably mounted to slide along the bar;

a catch for locking the shoe and mounted to pivot about a second transverse horizontal axis tied to the shoe and suitable for optionally co-operating with the notches of the bar so as to optionally lock the shoe relative to the bar, said catch including a top hook open horizontally facing towards the front of the seat;

a rocker pivotally mounted about a third transverse horizontal axis tied to the moving rail, the rocker including a first transverse finger organized to co-operate with a rear end of the shoe, a second transverse finger suitable for co-operating with the hook of the catch, and a heel suitable for co-operating with the latch; and resilient means for constantly urging the rocker in a first direction towards a first extreme angular position in which firstly the first finger is in a low position for horizontally entraining the shoe, secondly the second finger raises the hook of the locking catch of the shoe into a release position, and finally the heel permits cooperation of the latch with the notches of the stationary rail;

the slide further comprising servo-control means for causing forward folding down of the seat back to urge the rocker angularly in a direction opposite to the first direction, the rear end of the shoe being suitable for co-operating with the first finger of the rocker and having a downwardly-open V-shaped profile in a longitudinal vertical plane, the V-shaped profile being rearwardly defined by an edge having a direction chosen between a vertical direction and a direction which slopes downwards in a forwards direction, and being forwardly defined by a sloping ramp extending downwards in a forwards direction.

2. A slide according to claim 1, wherein the servo-control means for controlling the angular displacements of the rocker as a function of the folding down of the seat back comprises an inextensible cable having two ends connected respectively to the rocker and to the seat back.

3. A vehicle seat fitted with a slide according to claim 1.

4. A vehicle seat according to claim 3, comprising resilient means for angularly urging a seat back of the vehicle seat into a position in which the back is folded down angularly forwards, said elastic means being associated with a hinge mechanism of the seat back so as to intervene only when said mechanism is disengaged.

* * * * *